Jan. 12, 1965 W. GHISLER 3,165,722

MAGNETIC INFORMATION TRANSFER DEVICE

Filed Jan. 5, 1961 2 Sheets-Sheet 1

INVENTOR
WALTER GHISLER
BY
Roy C. Hopgood
ATTORNEY

INVENTOR
WALTER GHISLER
BY Roy C. Hopgood
ATTORNEY 3,165,722
Patented Jan. 12, 1965

3,165,722

MAGNETIC INFORMATION TRANSFER DEVICE

Walter Ghisler, Southampton, England, assignor to International Business Machines Corporation, New York, N.Y., a corporation of New York Filed Jan. 5, 1961, Ser. No. 80,837
23 Claims. (Cl. 340—174)

This invention, generally, relates to information transfer devices and, more particularly, to devices for storing information at one station and transferring the information magnetically for reading out at a second station.

The general class of magnetic materials which are used in computers or information processing systems are well known and are characterized usually by the ease with which the small magnetically saturated regions or domains are orientable in specific patterns. Changes in the orientation of the domains are achieved by magnetic switching, the switching being accomplished by rotation of the domains or by domain wall motion.

Rotational switching, on the one hand, involves the application of an externally driven magnetic field to the magnetic elements, so that each of the elements is rotated in a given plane from one to another state of magnetic remanence. This type of switching is usually at high speeds. On the other hand, domain wall switching is a process in which changes in the magnetization occur by the growth of domains oriented parallel to an applied field at the expense of domains oriented other than parallel to the applied field, and generally, this process is slower.

Usually, the magnetic materials in these systems are thin magnetic film elements. The term "thin magnetic film" (or just "magnetic film") is given to a layer of magnetic material, having a thickness generally less than 12,000 Angstrom units, which is deposited on a substratum.

Magnetic film elements which have a uniformly aligned magnetization permit a distinction to be made between isotropic and anisotropic magnetic layers. In the former, the magnetization of the domains remains in the position in which the switching process (accomplished by the application of an external magnetic field) places it. On the other hand, anisotropic magnetic layers contain preferred directions for the magnetization.

With thin magnetic layers having uniaxial magnetic anisotropy, the magnetization assumes a position which is parallel or anti-parallel to a definite preferred direction, this direction being termed the "easy direction." Analogously, a displacement of ninety degrees from this direction is termed a "hard direction," so that upon the application of a field transverse to the easy direction of the elements an element is said to have its domains rotated or deflected toward the hard direction. Upon termination of the applied transverse field, the domains return to a preferred, easy direction.

To cause complete switching in such an element from on easy direction to the opposite, a transverse field and a field anti-parallel to the direction of magnetization in which the element resides are applied. This causes rotational switching of the domains from one stable magnetic state to the other.

The two opposite easy directions of magnetization represent information, such as a ONE or a ZERO. It is evident, therefore, that thin film layers may be utilized for the static storing of information, and the application of the rotational switching techniques permits changing from one information state to the other.

In the past, devices have been developed using uniaxial anisotropic elements for transferring information. Generally, these prior systems have been one of two types; namely, the dynamic type in which strip lines are utilized to convey the information or the static type in which the information is transferred by magnetic stray field action.

In a dynamic type of arrangement, the static information is transformed into a pulse which lasts for a short period of time and is transmitted to a second magnetic element. In order to process the information, coincidence methods have to be utilized due to the relatively short time in which the pulses are present. As a result, operating difficulties arise from the translation of information into pulses and thereafter back to magnetically stored information.

In the static type of arrangement, translation of pulses and synchronous or coincidence methods do not have to be employed. However, these arrangements are inherently limited in their application, because the thin film elements must be located proximately with respect to each other in order to transmit the information.

Accordingly, it is an object of the invention to provide a device for magnetically transferring information without translating the information into electrical pulses.

It is another object of the invention to provide an arrangement for magnetically transferring information, through a medium capable of assuming different states of magnetic flux remanence indicative of the information, without employing coincidence methods.

It is a further object of the invention to provide an arrangement utilizing magnetic film elements for performing logical decisions.

A further object of the invention is to provide an arrangement which can store and transfer information magnetically in either dynamic or static form.

In accordance with a preferred form of the invention, an information transferring device includes an elongated strip of magnetic material in which the magnetic domains are alignable easily in two opposite directions of magnetization according to information to be transferred. An electrical conductor is positioned along the length of the strip so that an electrical pulse in the conductor tends to affect the domains of the strip magnetically so that when the domains are magnetically biased coincidentally with the pulse the domains are aligned in accordance with the desired information. The resultant directional position of the domains may be sensed magnetically by a detecting element.

The foregoing and other objects, features and advantages of the invention will be apparent from the following more particular description of a preferred embodiment of the invention, as illustrated in the accompanying drawings.

Figure 1B:
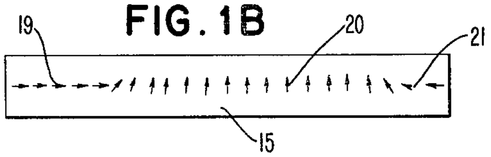
FIG. 1B is a diagrammatic illustration of a changing alignment in the domains of a transfer strip.
Figure 1A:
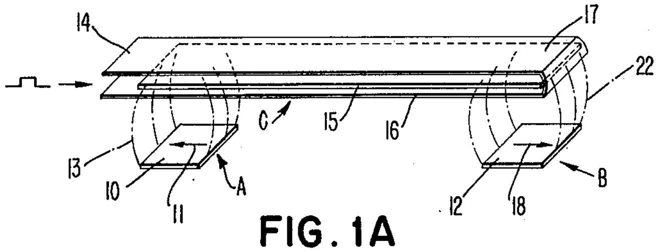
FIG. 1A is a view in perspective of an arrangement in accordance with the invention showing a device to transfer information.

Referring now to FIG. 1A of the drawings, binary information is stored at a first station A in a first magnetic film element 10 as indicated by an arrow 11, and a second station B is represented by a second magnetic film element 12 spaced from the first element 10 any desired distance. Each of the film elements 10 and 12 is formed to have the previously described uniaxial magnetic anisotropy characteristics.

An information transporting stripline C is positioned to span the distance between the two stations A and B and is located appropriately so that a magnetic field at either station couples the stripline. The dashed lines 13 indicate the magnetic field of the element 10 due to the binary information indicated by the arrow 11, and this magnetic field couples the end 14 of the stripline C.

Figure 1C:
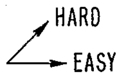
FIG. 1C is an illustration identifying magnetizable hard and easy directions in the transfer strip shown in FIGS. 1A and 1B.

The stripline C is formed of a magnetic thin film material 15 and an electrically conductive strip 16 so that an electrical pulse applied to the strip 16 at the end 14, for example, will be propagated along the length of the strip 16, and the magnetic effect of this pulse turns the magnetic domains in the adjacent portion of the thin film 15 to the hard direction, as illustrated by the vectors in FIG. 1C.

While the stripline C may be constructed physically in any suitable manner such as by depositing the thin film 15 on the conductive strip 16 by evaporation, electroplating, etc., it is shown in FIG. 1A merely for illustration purpose that the strip 16 is folded at the end 17 to provide a return path for an applied electrical pulse and the thin film material is shown separately. Therefore, it will be understood that this pulse is simply a transporting pulse and does not represent information. For this reason, each electrical pulse applied to the strip 16 should always be the same polarity, as will appear more clearly hereinafter.

It will follow from the above description that the stripline C need not necessarily be straight as depicted in FIG. 1A of the drawings. That portion of the stripline C intermediate the stations A and B may be looped, bent, twisted, etc., and therefore, information contained within the stripline C may be termed "stored" information as also will appear more clearly hereinafter.

In operation, assume that binary information represented by the arrow 11 is stored in station A, and it is desired to read this information into station B. In other words, it is desired to change the direction of magnetization represented by the arrow 18 in station B to be in the same direction as the arrow 11 in station A.

An electrical pulse is applied to the end 14 of the strip 16, and the magnetic effect of this pulse on the thin film 15 is to change the direction of the magnetic domains in the vicinity of the pulse to be aligned in the hard direction. This action is illustrated in FIG. 1B of the drawings.

Referring to FIG. 1B, the arrows 21 indicate the direction that the domains in the thin film 15 may have been in before the electrical pulse is applied. The magnetic effect of the electrical pulse will turn these domains in the thin film 15 to the hard direction, as indicated by the arrows 20.

Now, these domains (indicated by the arrows 20 in FIG. 1B) can only remain in the hard direction while influenced by the magnetic effect of the electrical pulse, and therefore, if there is no other influence on these domains as the electrical pulse passes, they return to either one of the two opposite, easy directions. However, the end 14 of the stripline C is influenced magnetically by the static field due to the direction of magnetization of the element 10.

Therefore, after the electrical pulse moves past the station A, the magnetic field indicated by the lines 13 applies a bias to the domains and causes them to align themselves as indicated by the arrows 19 which it will be noted is the same clockwise field as that produced by station A, as viewed in FIG. 1A. The domains 20 immediately adjacent the domains 19 are biased to rotate in like manner after the magnetic effect of the pulse has passed, due to the orientation of the domains 19, and therefore, the information represented by the arrow 11 is propagated in reverse form along the length of the thin film material 15.

In the vicinity of station B, the magnetic effect of the domains 21, after they are oriented in a reverse direction similar to those shown and labeled 19, link the element 12, as indicated by the dashed lines 22. Therefore, if the domains in the element 12 are rotated momentarily into the hard direction by, for example, passing a "set" pulse along an adjacent conductor (not shown), the domains in the element 12 will reverse from the direction indicated by the arrow 18, in a manner similar to that described above.

More particularly, with the domains in element 12 oriented in the hard direction due to the "set" pulse, the stray field 22 coupling the element 12 causes the domains 18 of element 12 to switch toward an opposite direction. The domains in the element 15 in the vicinity of the element 12, being oriented as indicated by domains 19 in the FIG. 1B, bias the element 12 with a stray field 22 directed clockwise as viewed in FIG. 1A in the plane of the element 12 causing rotation of the domains in the element 12 toward the left, similar to that shown in the element 10. Thus, upon termination of the "set" pulse, the domains of element 12 relax and align themselves along the easy direction thereof in a direction similar to that shown for element 10, completing the transfer operation from station A to station B.

With respect to the transporting pulse, its length is of no consequence, nor is its leading edge. However, the trailing edge is of importance, and it should be as short as possible to avoid interference with the stray field action of the domains which have already been turned to one of the easy directions. This permits the stray field to exert a strong influence on the adjacent domains that are still oriented in the hard direction. In addition, the speed of propagation of the pulse should be slower than the highest possible propagation speed of the domain switching process, so that the effects of the stray field and the generated field are applied coincidentally to each domain of the film element C.

Figure 2A:
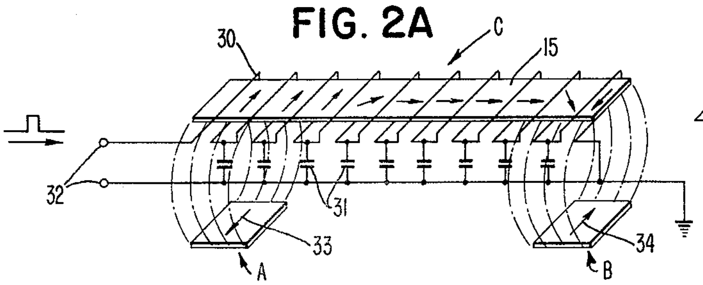
FIG. 2A is an arrangement similar to FIG. 1A, but showing a lumped impedance delay line to conduct an electrical pulse between two stations.

In accordance with the principles of the invention, the structure of the stripline C may assume the characteristics shown in FIG. 2A of the drawings, which shows the thin film 15 in magnetic field applying relationship with an inductive-capacitive delay line of the lumped constant type. A coil 30 is wound around the thin film element 15 to form the inductive portion of the delay line, and capacitive elements 31 are connected in parallel with the inductive loops to complete the delay line.

The transporting pulse described previously as being applied to the conductive strip 16 in FIG. 1A now is applied to terminal connections 32 of the delay line shown in FIG. 2A. The delay line introduces a sufficient delay to limit the speed of propagation of the transporting pulse to a speed less than the highest propagation speed of the domain switching process in the thin film 15, as described previously.

Figure 2B:
FIG. 2B is an illustration similar to FIG. 1B.

As shown in FIG. 2B, the orientation of the easy and hard directions of magnetization are shifted ninety degrees from that shown in FIG. 1C due to the direction of propagation of the electrical pulse through the delay line. In other words, a transporting pulse in FIG. 2A is conducted by the coil 30 which encircles the thin film element 15, and therefore, the magnetic field of the transporting pulse in FIG. 2A is at ninety degrees to that of a pulse in FIG. 1A. In all other respects, however, the operation of the arrangement shown in FIG. 2A is the same as that of FIG. 1A.

The arrow 33 in station A indicates the information that is desired to be read into station B. In other words, it is desired to change the direction in which station B is magnetized (indicated by the arrow 34) to correspond with the arrow 33 in station A. The operation to accomplish this is the same as described previously in connection with FIGS. 1A, 1B and 1C.

As stated previously, the arrangement of FIGS. 1A and 2A transfer to station B the same information stored at station A. It may be desirable in some instances to provide an arrangement for reading into station B the binary opposite of the information stored at station A. This is achieved in accordance with the invention by transposing the binary information during transmission between stations. Structures to accomplish this are shown in FIGS. 3 and 4.

Figure 3:
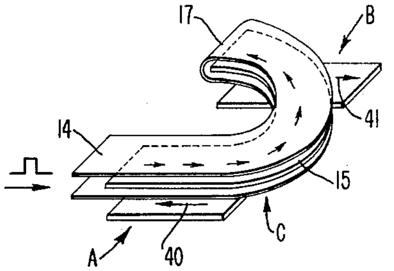
FIG. 3 is an arrangement similar to that of FIG. 1A, to transpose the transferred information.

Referring first to FIG. 3 and using the same reference numerals to identify elements similar to those described previously above, the stripline C is bent arcuately, such as in the form of a semi-circle, so the opposite ends 14 and 17 are displaced laterally but substantially in a common plane. By this arrangement, information to be read into station B approaches station B from the right, whereas in the arrangements shown in FIGS. 1A and 2A, the information approaches station B from the left.

By way of example, assume that the information stored in station A is indicated by the arrow 40 which may be a binary ZERO, if desired. This information is transmitted in the stripline C as described previously in connection with FIGS. 1A, 1B and 1C. However, since the stripline C in FIG. 3 crosses station B from the right (reverse of that shown in FIGS. 1A and 2A), the magnetization of station B will result as indicated by the arrow 41 which may be a binary ONE (the opposite of station A).

Figure 4:
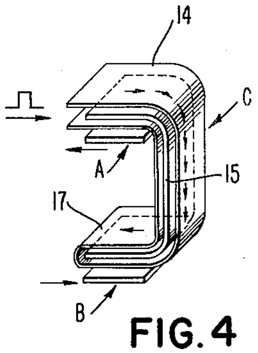
FIG. 4 is an embodiment similar to FIG. 3 to transpose the transferred information.

The arrangement of FIG. 4 accomplishes the same transposition as the arrangement of FIG. 3. However, the stripline C in FIG. 4 has a horseshoe-like shape, and the stations A and B are positioned respectively in vertically spaced apart planes. If it is assumed again that the information in station A is stored in the easy direction having the binary connotation ZERO, it is apparent that this information is conveyed through the stripline C, crossing station B from right-to-left, and, therefore, reading a binary ONE into station B.

In the above discussion, the storing and transferral of binary information in magnetic form has been described. It should be obvious, therefore, that the principles of the invention also may be utilized to perform logical decisions in a logic element at the point where the transferral of the information begins. Specifically, an arrangement is provided in FIG. 5A for performing AND and OR logic functions by use of majority type operations when information is represented in binary form as a ONE or as a ZERO.

The AND function is performed by a device which produces an output signal of one binary connotation if all of the input signals have this connotation; that is, an AND circuit is a coincident circuit having an output depending upon the coincidence of all of the inputs. The OR circuit, on the other hand, produces an output of one connotation if at least one of the input signals has this same connotation.

Figure 5A:
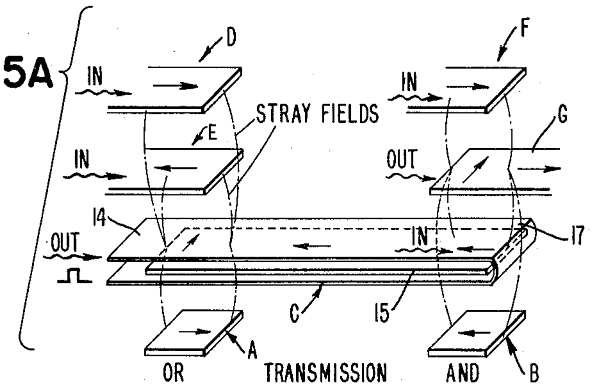
FIG. 5A is an arrangement utilizing the principles of the invention for performing logical circuit decisions.
Figure 5B:
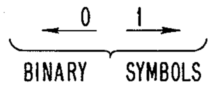
FIG. 5B is an illustration of the directions of magnetization to represent binary symbols.
Figure 5C:
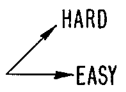
FIG. 5C is an illustration identifying magnetizable hard and easy directions in the transfer strip shown in FIG. 5A.

Referring now to FIG. 5A, the operation of an OR gate is described with respect to the left side of this figure and the operation of an AND gate with respect to the right side. As shown on the left side of the FIG. 5A there are two information inputs and one clock input to the output circuit which is the transferring film element C. The information inputs are the A element and an element E on which the OR logic is manifested and a clock input D.

The information in the A and D elements is in binary ONE form, whereas the information in the E element has a ZERO connotation. The field lines from each of the elements A, D, E to the transferring element C are shown to indicate the effect of the magnetic stray field of each of these elements with respect to the transferring element C.

The D element is always left in the binary ONE form while variable information input is provided to elements A and E. Thus, if any one element A or E is in the ONE state while the other is in the ZERO state, the stray field from both these elements couples one another and provides no net field to the C element. With both elements A and E in the binary ZERO state, their stray fields overcome the stray field from element D and bias the element C toward the binary ONE state. Since information is transported by the element C in inverse form, biasing the element C in the ONE state provides a ZERO output, as will become clear subsequently.

Assume that the information in the D and E elements have opposite binary connotations which off-set each other, thereby permitting the information in the A element to be transferred along the C element after a pulse has been applied to the stripline conductor to bias the domains into the hard direction as described for FIG. 1. It is transferred in the form of a binary ZERO after the magnetic domains of the C element are successively biased to the hard direction.

The wavy lines indicate the direction of propagation of the information transferral, so that the information arrives at the opposite end of the transferring element C in the form of a binary ZERO. As previously noted, an AND function is performed at this location in accordance with majority type logic.

The output of this AND circuit is the element indicated as G and has three inputs, namely, the B element which is adapted to have variable information stored therein, C element which is adapted to transfer the variable information, in inverse form, denoting the logic of the OR operation discussed above, and an element F which is adapted to retain or be energized to exhibit the binary ONE state at all times. Thus, the actual AND operation is dependent upon the variable information manifested in both the elements B and C, while the element F is employed to bias and negate the field coupling of any one element B or C in the ZERO state.

In the FIG. 5A, the elements B and C posses information in the form of a binary ZERO and the element F has information in the form of a binary ONE.

The effects of the stray fields from these elements on the domains of the element G are shown by the lines connecting the elements. Since the information input elements B and C have the same information therein, i.e. are oriented in the binary ZERO sense, upon application of a field which orients the magnetization of element G into the hard direction, the domains thereof are biased toward the binary ONE direction and relax to this state as the transporting pulse to the element C moves along the element C as described above.

With any one element B or C in the binary ONE direction, it may be seen that the majority of elements B, C and F would be in the binary ONE direction, and therefore, the stray fields therefrom provide a net field to the element G which is directed toward the binary ZERO state. Thus to manifest a binary ONE in the element G, both the information inputs, B and C must be in the binary ZERO state.

Thereafter, the element G may be utilized to transfer the logical manifestation of AND to another magnetic circuit. For this purpose, an electrical conductor such as the stripline C of FIG. 1 may be packed around the film element G, and an electrical pulse is applied to the conductor to generate a magnetic field in the element G biasing each successive magnetic domain of this element into the hard direction in the chain manner, as described for the thin film 15 of FIG. 1.

The magnetic domains of thin magnetic film elements also may store information in dynamic form and be excited in a parametric way. Thus, two parametrically oscillating films can be coupled magnetically over a long distance without using stripline conductors to translate the information into electrical pulses and thereafter back into magnetic oscillations. An arrangement for accomplishing this is shown in FIG. 6.

Figure 6B:
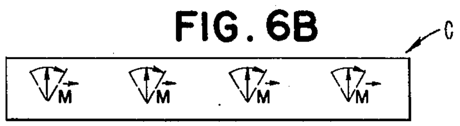
FIGS. 6A and 6B are arrangements similar to FIGS. 1A and 1B to illustrate the structure of the invention as excited parametrically.
Figure 6A:
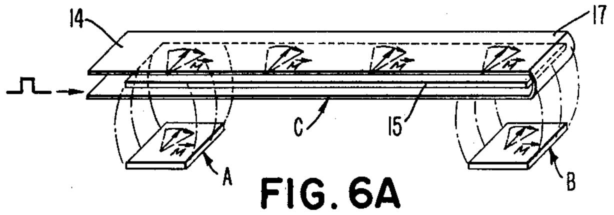
Figure 6C:
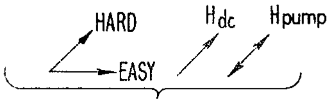
FIG. 6C is an illustration similar to FIGS. 1C, 2B and 5C.

Referring now to FIG. 6, the stations A and B and the stripline C are arranged in the same manner as the arrangement of FIG. 1, with the thin film element 15 acting as the transferring medium. The magnetic domain of the thin film element in station A oscillates due to the application of an external pumping magnetic field on it; the oscillations being in the hard direction due to an externally applied magnetic field $H_{d-c}$, FIG. 6c.

The magnetic domains of the thin film element 15 in the stripline C also are caused to oscillate by the application of this pumping field. However, assume initially that these oscillations are out of phase with the oscillations of the domain of the thin film element of station A.

When a transporting pulse is applied to the stripline C, a magnetic field is generated in the immediate location of the pulse as it travels through the conductor. This field of the pulse offsets the effect of the magnetic field $H_{d-c}$ until the pulse has passed, and during this interval, the phase of the domains are brought into coincidence with those of station A.

Thereafter, the magnetic domains of the stripline C oscillate again, and now, the phase of these oscillations at the point most adjacent the station A are determined by the phase of the oscillations in the station A. Each adjacent domain in the stripline C (until the right side of the stripline is reached) oscillates in accordance with the preceding one, so that the domain oscillations in the stripline C have the same phase as those of the station A.

The oscillation information which is transmitted by the stripline C is transferred by stray field action to the thin film element at station B by applying a magnetic field to station B to offset the oscillations of this element. After this magnetic field is removed, the oscillations begin again in station B and have the same phase as those of station A.

Figure 7:
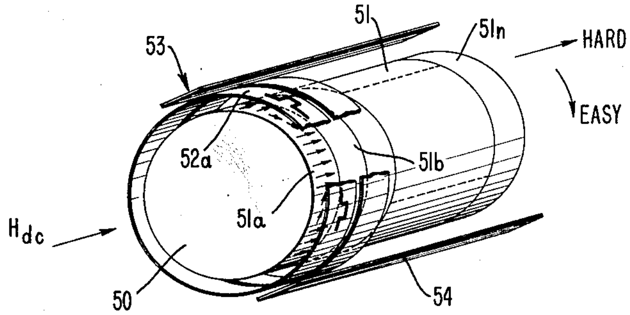
FIG. 7 is a magnetic drum memory device in accordance with the principles of the invention.

The principles of the invention may also be applied to the storage of information in binary form in memory units. Such an application is shown in FIG. 7. A nonrotating magnetic drum 50 has its surface covered by an anisotropic magnetic thin film 51 such as described above, and the film 51 is subdivided into a plurality of separate tracks 51*a*, 51*b* . . . 51*n*. A magnetic field $H_{d-c}$ is applied axially over the entire drum biasing all the magnetic domains in each track into the hard direction.

Around each track there is proximately position a circumferential stripline conductor, such as shown at 52*a* for the track 51*a*. A series of delayed electrical pulses circulate in each of the stripline conductors at predetermined spaced intervals.

These pulses in each stripline conductor are of the same type as the transporting pulses described in connection with FIG. 1, and, as such, they do not carry any information. They do not have to be regularly applied at a particular repetition rate, but may be applied intermittently as desired.

When a pulse is present above a particular magnetic domain, the magnetic effect of the applied axial field $H_{d-c}$ is negated, and the vector of the magnetic domain is freed to assume one of the easy directions of magnetization. An information pulse applied to an adjacent strip 53 produces a magnetic field to determine which of the easy directions the domains under the transporting pulse will take. After the direction of the domains beneath a transporting pulse is once determined, it is retained and the information is transported around the track beneath the pulse as it is coincident with each succeeding magnetic domain due to the stray field action between adjacent domains.

Information may be read out from this memory unit by mounting a conductor 54 in proximate relationship to the surface and parallel to the axis of the drum. When an electrical pulse is applied to this conductor, it produces a magnetic field to negate the effect of the field $H_{d-c}$, and the domains in the conductor 54 adjacent a particular track will assume the easy direction of the information stored and circulating in the track at the instant of coincidence. As previously described, the information in each track on the drum is transferred around the drum in circulating fashion for an indefinite period of time until it is read out by the use of the conductor 54.

While the invention has been particularly shown and described with reference to preferred embodiments thereof, it will be understood by those skilled in the art that various changes in form and details may be made therein without departing from the spirit and scope of the invention.

What is claimed is:

1. An information transfer device, comprising an elongated strip portion of an isotropic magnetic material having a plurality of magnetic domains alignable in opposite stable states along an easy axis of magnetization exhibited by said material for transferring information in accordance with the alignment of said domains, electrically conductive means in juxtaposition with said strip portion along its length for propagating an electrical pulse along its length and apply a magnetic field transverse with respect to the easy axis of said strip to orient the domains thereof into a hard direction, information input means for applying a magnetic field to a portion of said strip directed along the easy axis thereof coincidently with said pulse at a predetermined location in said strip to cause said domains to remanently align themselves according to the direction of said information field after said pulse is passed, and means coupled magnetically to said strip at a point spaced from said information input means for detecting said information.

2. An information transfer device, comprising an elongated strip portion of magnetic material having a plurality of magnetic domains exhibiting easy directions of magnetization along which the domains tend to align themselves in one of said easy directions thereby defining different states of magnetic remanence adapted to represent information, electrically conductive means in juxtaposition with said strip portion along its length for conducting an electrical pulse which tends to affect said domains magnetically to orient the domains in a hard direction, means to apply information in the form of a magnetic bias to said domains coincidently with said pulse at a predetermined location in said strip causing said domains to align themselves in one of said easy directions indicative of said information after the magnetic effect of said pulse is passed, and means magnetically coupled to said elongated strip for detecting said information.

3. An information transfer device, comprising an elongated strip portion of magnetic material having a plurality of magnetic domains exhibiting easy directions of magnetization along which the domains tend to align themselves in one of said easy directions thereby defining different states of magnetic remanence adapted to represent information, electrically conductive means in juxtaposition with said strip portion along its length for conducting an electrical pulse which tends to affect said domains magnetically aligning them away from said easy directions, means for applying information in the form of a magnetc bias to said domains coincidently with said pulse at a predetermined location in said strip causing said domains to align themselves in one of said easy directions indicative of said information after the magnetic effect of said pulse is passed, and means magnetically coupled to said strip for detecting said information.

4. An information transfer device, comprising an elongated strip portion of magnetic material having a plurality of magnetic domains normally exhibiting easy directions of magnetization, said strip being magnetically pre-biased to establish a state of magnetization aligning said domains differently from said normally exhibited easy directions, electrically conductive means in juxtaposition with said strip portion along its length for conducting an electric pulse which tends to negate said state, means to apply a magnetic bias indicative of information to said domains coincidently with said pulse at a predetermined location in said strip causing said domains to operate in a second magnetic state, and means magnetically coupled to said strip for detecting said information.

5. The device of claim 4, wherein said strip is cylindrically formed, and said electrical conducting means comprises a circumferential conductor for conducting at least one electrical pulse, so that said pulse circulates through said conductor around said strip negating the effect of said first magnetic state to cause each of said domains to assume said second magnetic state of the domain most recently affected by said circulating pulse.

6. The device of claim 5, wherein said means to apply a magnetic bias comprises an electrical conductor for conducting an electrical pulse indicative of said information, said conductor being axially parallel and magnetically coupled to said strip for magnetically introducing said information into said strip at said predetermined location when the circulating pulse is coincident with the information pulse.

7. The device of claim 5, wherein the cylindrical strip is divided into a plurality of circular tracks each having a conductor circumferentially disposed with respect to it for conducting at least one electrical pulse.

8. The device of claim 4, wherein said conductor comprises a linear stripline conductor magnetically coupled along its length to said strip, the magnetic domains of said strip being pre-biased into an oscillatory state in a direction other than said easy direction, said means to apply a bias comprises a second strip of magnetic material coupled magnetically to said predetermined location in the first strip and having at least one magnetic domain biased in an oscillatory state different from that of the domains of the first strip and indicative of said information, so that after the state of the domains of the first strip is negated by said pulse, said information from said second strip is introduced into the domains of said first strip.

9. The device of claim 8, wherein said means for detecting said information comprises a third strip of magnetic material having at least one magnetic domain, said third strip being magnetically coupled to a predetermined location in the first strip displaced from the location of coupling to said second strip, so that the domain of said third strip is influenced by those of the first strip causing the third strip domain to oscillate in the same state as said information.

10. The device of claim 1, wherein said means to apply a magnetic bias comprises a second strip of magnetic material having an easy axis of remanent domain orientation and remanently magnetized to indicate said information, said second strip being coupled magnetically at said predetermined location with their easy axes in alignment to cause the magnetic domains of the first strip to align themselves according to said information after said pulse has passed.

11. The device of claim 10, wherein said means for detecting said information comprises a third strip of magnetic material having an easy axis of remanent domain orientation, said third strip being coupled magnetically to a predetermined location in the first strip displaced from the location of coupling to said second strip with the easy axis of said first and third strips in alignment, and means for applying a magnetic field to said third strip to orient the domains thereof in a hard direction so that the domains of said third strip is influenced by those of the first strip causing the third strip domains to align in a direction dictated by the domain orientation of said second strip.

12. The device of claim 2, wherein said means to apply a bias comprises a second strip of magnetic material coupled magnetically to said predetermined location in the first strip and having at least one magnetic domain exhibiting easy directions of magnetization along which the domain tends to align itself thereby defining different states of magnetic remanence adapted to represent said information, the magnetic domain of said second strip being aligned to indicate a state of information, so that after said pulse has passed, the magnetic domains of said first strip align according to the information in said second strip.

13. The device of claim 12, wherein said conductor is a linear stripline coupled magnetically along its length to said strip.

14. The device of claim 12, wherein said conductor is an inductive-capacitive delay line having its inductive portion coupled magnetically to the first strip along its length, said delay line limiting the speed of travel of said pulse.

15. The device of claim 12, wherein the end portions of said first strip are turned with respect to the center portion of said first strip, said means for detecting said information comprises a third strip of magnetic material having at least one magnetic domain for alignment in one of said easy directions according to said information, and said second and third strips are coupled magnetically to the respective ends of said first strip, so that the information transferred to said third strip is opposite to that of said second strip.

16. The device of claim 15, wherein said first strip is bent arcuately, and said second and third strips are positioned in substantially the same plane.

17. The device of claim 15, wherein said first strip is horseshoe-shaped, and said second and third strips are positioned in different planes.

18. The device of claim 12, and further comprising third and fourth strips of magnetic material, each having at least one magnetic domain alignable in an easy direction of magnetization indicative of said information, three of said strips being adapted to constitute inputs to an OR gate whose output is the remaining strip coupled magnetically to said three strips.

19. The device of claim 12, and further comprising third and fourth strips of magnetic material, each having at least one magnetic domain alignable in an easy direction of magnetization indicative of said information, three of said strips being adapted to constitute an input to an AND gate whose output is the remaining strip magnetically coupled to said three strips, so that on the concurrence of the same information in said three strips, the remaining strip carries an output from said gate having the opposite information.

20. An information transfer device, comprising an elongated strip portion of magnetic material having a plurality of magnetic domains exhibiting easy directions of magnetization along which the domains tend to align themselves thereby defining different states of magnetic remanence adapted to represent information, said strip being magnetically pre-biased to establish a state of magnetization aligning said domains differently from said normally exhibited easy directions, electrically conductive means in juxtaposition with said strip portion along its length for conducting an electrical pulse which tends to offset said pre-biased state of magnetization, a first parametrically excited device exhibiting a plurality of phase stable states positioned to apply a magnetic bias indicative of information to said elongated strip portion coincidently with said electrical pulse at a predetermined location in said strip portion whereby said domains are aligned in phase with said parametrically excited device, and a second parametrically excited device exhibiting a plurality of phase stable states positioned to couple said elongated strip portion magnetically for detecting the phase of parametric excitation.

21. An information transfer device comprising the subcombination of;

an elongated anisotropic strip of magnetic material exhibiting an easy axis of remanent domain orientation along the longitudinal axis thereof;

means coupled to said strip for propagating a magnetic field along, and directed transverse to, the longitudinal axis of said strip to orient the magnetization of succeeding portions into a hard direction;

and means coupled to different portions of said strip including information input means for applying a magnetic field directed along the easy axis of said strip coincidently with the passage of said propagated magnetic field to cause remanent orientation of the magnetization of said strip after passage of said propagated pulse in accordance with the direction of the applied information field.

22. An information transfer device comprising the subcombination of, a first means including a first thin magnetic layer having alignable magnetic domains which may assume easy or hard directions and in which information may be entered and stored in accordance with one of said easy directions, a transferring means comprising a second thin magnetic layer having a plurality of alignable magnetic domains which may assume easy or hard directions and conductive means substantially coextensive with said second thin magnetic layer for conducting an electrical pulse producing a magnetic field to align respective domains when coupled to said magnetic field in the hard direction, said first thin magnetic layer having the domains thereof magnetically coupled to the domains of said second magnetic layer, whereby said electrical pulse causes the domains of said second magnetic layer of said transferring means coupled to said first magnetic layer to assume initially the hard direction and thereafter assume the easy direction in accordance with the easy direction of said domains of said first magnetic layer, said domains of said second magnetic layer assuming hard directions in seriatum in accordance with the travel of said electrical pulse and thereafter returning to the easy direction influenced by the preceding domain, said transferring means having a speed of propagation of said electrical pulse which is slower than the highest possible seriatum domain switching speed of said domains of said second magnetic layer.

23. The transfer device of claim 22 having third means including a third magnetic layer having alignable domains which may assume easy or hard directions positioned spaced apart from said first means, but having the domains thereof coupled to said second magnetic layer at a predetermined location.

References Cited in the file of this patent

UNITED STATES PATENTS

| | | |
|---|---|---|
| 2,919,432 | Broadbent | Dec. 29, 1959 |
| 2,984,825 | Fuller | May 16, 1961 |
| 3,068,453 | Broadbent | Dec. 11, 1962 |

OTHER REFERENCES

Physical Review, "Magnetic Reversal Nuclei," by K. J. Sixtus, vol 48, Sept. 1, 1935, pp. 425–430.

UNITED STATES PATENT OFFICE

CERTIFICATE OF CORRECTION

Patent No. 3,165,722 January 12, 1965

Walter Ghisler

It is hereby certified that error appears in the above numbered patent requiring correction and that the said Letters Patent should read as corrected below.

Column 8, line 28, for "an isotropic" read -- anisotropic --; line 75, for "magnetc" read -- magnetic --.

Signed and sealed this 1st day of June 1965.

(SEAL)
Attest:

ERNEST W. SWIDER
Attesting Officer

EDWARD J. BRENNER
Commissioner of Patents